United States Patent [19]

Terpstra

[11] Patent Number: 4,960,026
[45] Date of Patent: Oct. 2, 1990

[54] QUICK ACTION BAND SAW BLADE TENSIONING DEVICE

[75] Inventor: Daniel A. Terpstra, Kirkwood, Mo.

[73] Assignee: Emerson Electric Co., St. Louis, Mo.

[21] Appl. No.: 419,960

[22] Filed: Oct. 11, 1989

[51] Int. Cl.$^5$ ............................................. B26D 1/48
[52] U.S. Cl. .......................................... 83/818; 83/816
[58] Field of Search ................. 83/814, 816, 818, 815, 83/817, 819

[56] References Cited

U.S. PATENT DOCUMENTS

| | | | |
|---|---|---|---|
| 1,125,738 | 1/1915 | Schmelzle | 83/818 X |
| 1,879,145 | 9/1932 | Erickson | 83/818 |
| 2,525,557 | 10/1948 | Martignone | 83/818 |
| 2,711,196 | 6/1953 | Daniel | 83/811 |
| 3,563,285 | 2/1971 | Thrasher | 83/818 |

*Primary Examiner*—Frank T. Yost
*Assistant Examiner*—Kenneth E. Peterson
*Attorney, Agent, or Firm*—Polster, Polster and Lucchesi

[57] ABSTRACT

A quick action band saw blade tensioning device is disclosed. The band saw blade tensioning device is used in a band saw machine having at least upper and lower band saw supporting wheels operatively rotatably mounted to a supporting frame. The band saw blade tensioning device includes a wheel support pivotally mounted to the supporting frame about a wheel support pivotal mount, one of the upper and lower band saw supporting wheels being rotatably mounted to the wheel support about a wheel support rotatable mount, and an adjustable device for pivotally moving the wheel support and its rotatably mounted band saw about the wheel support pivotal mount so as to apply a greater or lesser tensioning force to the band saw as desired. The adjustable device includes an elongated wire spring which is attached to the pivoting wheel support to provide the desired tensioning force to the band saw blade. Tension is maintained by clamping the deflected spring into place.

20 Claims, 3 Drawing Sheets

QUICK ACTION BAND SAW BLADE TENSIONING DEVICE

BACKGROUND OF THE INVENTION

The present invention relates to a quick action band saw blade tensioning device for quickly adjusting the tension force applied to the band saw blade and for maintaining the tensioning force in place following adjustment.

Band saw machines include a supporting frame having upper and lower band saw supporting wheels (two wheel band saw) or upper and lower band saw supporting wheels and a driven wheel (three wheel band saw), all of which are rotatably mounted to the supporting frame. A band saw is entrained about the upper and lower band saw supporting wheels in the two band saw wheel machine and about the upper and lower supporting wheels and a driven wheel in the three wheel band saw machine. For driving the band saw in an endless closed loop path about the band saw wheel supports, an electric motor is operatively connected to one of the upper and lower band saw supporting wheels in the two wheel band saw machine or to the driven wheel in the three wheel band saw machine to drive the band saw in its endless closed loop path for cutting workpieces, as is well known.

The tensioning force applied to a band saw blade must be adjusted from time to time, in order to operate the band saw blade with maximum efficiency and cutting capability. Under normal procedures, band saw blade tensioning is controlled through the use of a rotating knob and coil spring adjustment mechanism such as disclosed, for example, in U.S. Pat. Nos. 2,644,491 and 2,744,547. As disclosed in both of these patents, the rotating knob and coil spring tensioning force adjusting mechanism operates to move one of the upper and lower supporting wheels toward and away from one another for adjustment of the band saw blade tension. Another device shown in U.S. Pat. No. 2,711,196 includes a slide member which is adjusted upwardly or downwardly to continuously apply tension to a band saw blade.

Although such known devices have been effective in providing the desired tensioning force to a band saw blade, they have several known deficiencies. In the rotating knob with compression spring type of device, it is necessary to rotate the knob several times, and in some cases, many times, in order to obtain the desired adjustment. As will be understood, this can be a time consuming procedure. Also, instructions for band saw machines suggest that it is desirable to relieve the band saw blade tension following use so as to remove the load on the supporting components, which can lead to other problems in the band saw. In either the rotating knob/compression spring tensioning force devices and in other continuous tension force mechanisms, substantial time is also required to relieve the tension force on the band saw blade and then re-engage the tensioning force at a later time for subsequent use. As will be appreciated in the disclosure of this invention in the discussion that follows, the aforementioned and other problems have been overcome in the quick action band saw blade tensioning device of the present invention.

SUMMARY OF THE INVENTION

Among the several objects and advantages of the present invention include:

The provision of a quick action band saw blade tensioning device for a band saw which overcomes the aforementioned deficiencies;

The provision of the aforementioned quick action band saw blade tensioning device which provides simple and fast adjustment for the tensioning force to be applied to the band saw blade;

The provision of the aforementioned quick action band saw blade tensioning device which uses the deflection of an elongated straight spring attached to a pivoting wheel support to provide the desired tensioning force to the band saw blade;

The provision of the aforementioned quick action band saw blade tensioning device which maintains the tension by clamping the deflected spring of the device in place;

The provision of the aforementioned quick action band saw blade tensioning device which uses a minimum number of parts, is easy to operate and maintain, enables users to quickly apply the desired amount of tension before use as well as quickly relieve the tension following use; and is otherwise well adapted for the purposes intended.

Briefly stated, the invention relates to a quick action band saw blade tensioning device for a band saw machine. The band saw machine includes a supporting frame having at least upper and lower band saw supporting wheels operatively rotatably mounted to the supporting frame. A band saw is entrained and driven about the upper and lower band saw supporting wheels. The band saw tensioning assembly includes a wheel support pivotally mounted to the supporting frame about a wheel support pivotal mount. One of the upper and lower band saw supporting wheels is also rotatably mounted to the wheel support about a wheel support rotatable mount. The band saw blade tensioning assembly further includes means for adjustably pivotally moving the wheel support and its rotatably mounted band saw supporting wheel about the wheel support pivotal mount so as to apply a greater or lesser tensioning force to the band saw as desired.

The means for adjustably pivotally moving the wheel support and its rotatably mounted band saw supporting wheel about the wheel support pivotal mount comprises spring means preferably in the shape of an elongated wire spring having a generally straight in longitudinal direction and round in cross-section unbiased shape. One end of the elongated wire spring is attached to the wheel support and the other end is adjustably movable in an arc about the wheel support pivotal mount. The other end of the elongated wire spring is mounted for movement relative to a curvilinear slot in the frame, and means are provided for locating the other end of the elongated wire at various positions along the curvilinear slot to maintain the tensioning force to the saw blade, while the elongated wire spring is longitudinally free or slidable relative to the locating means. The locating means includes a manually adjustable catch mechanism that is interengaged relative to a series of catch engaging positions adjacent the curvilinear slot.

The wheel support includes means for stabilizing the wheel support during adjustment thereof. The stabilizing means includes an elongated opening provided in the wheel support which is spaced from the wheel support pivot mount and on an opposite side of the wheel support rotatable mount, and a headed stud having a shank extending through the elongated opening which is attached to the supporting frame. The elongated opening is configured, arranged and dimensioned to permit pivotal movement of the wheel support during adjustment while the stud shank and elongated opening combined to stabilize the wheel support during adjustment.

The wheel support pivotal mount and the wheel support elongated opening are positioned on different sides of the wheel support rotatable mount with respect to each other and on the same side of the wheel support rotatable mount with respect to the attachment of the elongated wire spring to the wheel support. The wheel support includes a trough for receiving the attached end of the elongated wire spring and a headed stud is threadable mounted to the wheel support in proximity to the elongated wire spring for engaging and securing the elongated wire spring within the trough of the wheel support.

Further objects of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENT

Figure 1:
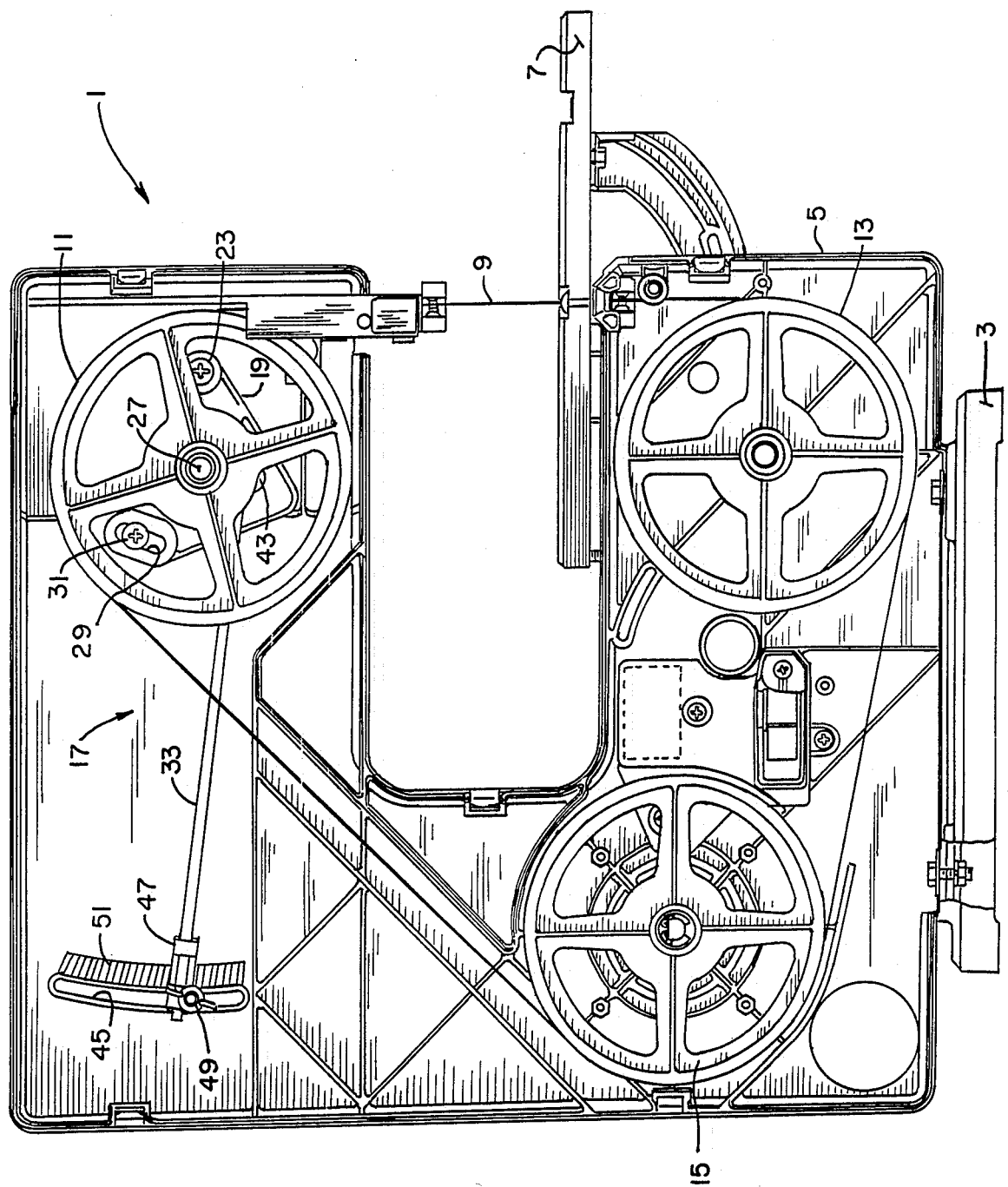
FIG. 1 is a side elevational view of a three wheel band saw machine with the outer frame cover removed in order to visualize the operating components thereof including the quick action band saw blade tensioning device which is associated with the upper band saw supporting wheel.
Figure 2:
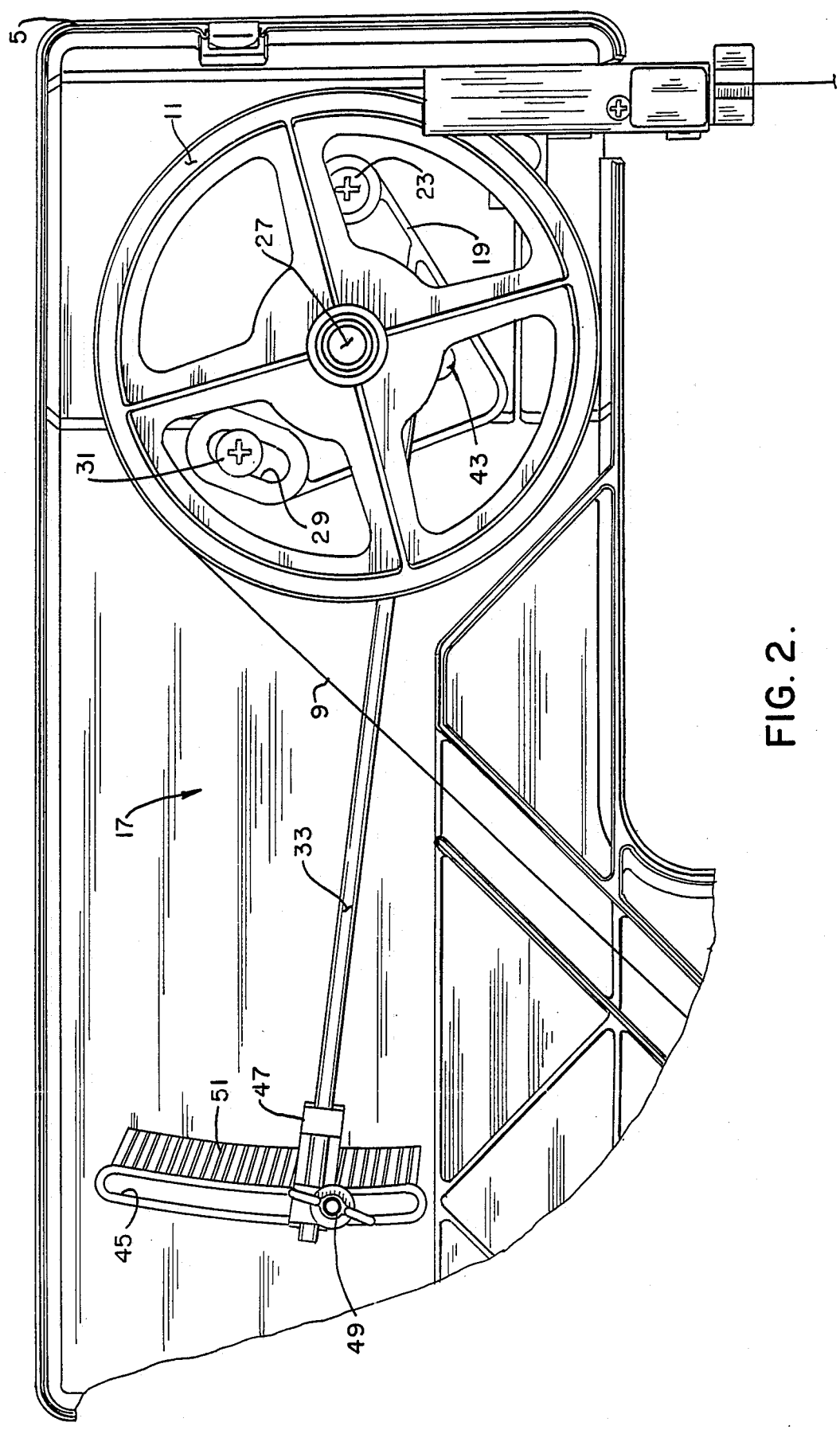
FIG. 2 is an enlarged fragmentary side elevational view of the upper band saw supporting wheel and the quick action band saw blade tensioning device of the present invention associated therewith.

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Although the quick action band saw blade tensioning device of the present invention is disclosed in connection with a three wheel band saw machine, it will be understood that it can also be used with a two wheel band saw machine as well. Further, although the quick action band saw blade tensioning device is preferably used in connection with the upper band saw supporting wheel, it will be appreciated that it may be used with the lower band saw supporting wheel, if desired.

The band saw machine 1 illustrated in the drawings is a three wheel band saw machine having a base 3 and a C-shaped supporting frame 5 with a work table 7 mounted on the lower leg of the C-shaped supporting frame 5. The band saw 9 is guided within upper and lower guide assemblies, (not specifically described), for cutting workpieces resting on the work table 7.

The band saw 9 is entrained about upper and lower band saw supporting wheels 11, 13 which are rotatably mounted in the upper and lower legs of the C-shaped supporting frame 5, as well as being entrained about a driven wheel 15. The driven wheel 15 is powered by an electric motor (not shown) for driving the band saw 9 in an endless closed loop path about the driven wheel 15, as well as the upper and lower band saw supporting wheels 11, 13, as shown in FIG. 1. All of the above described components are well known in the art and have been described for the purpose of providing a background setting for the quick action band saw blade tensioning device of the present invention.

As shown in the drawings, the quick action band saw blade tensioning device is generally identified at 17 and is associated with the upper band saw supporting wheel 11. The tensioning device or assembly 17 includes a wheel support 19 having a general triangular shape except at one corner area thereof (See FIG. 3). The generally triangular shaped wheel support 19 includes aperture 21 (See FIG. 3) in one corner area thereof for receiving the headed stud 23 for pivotally mounting the wheel support 19 to the supporting frame 5. In a central area of the wheel support 19, an aperture 25 (see FIG. 3) is provided for receiving the upper band saw wheel axle 27 in order to rotatably mount the upper band saw supporting wheel 11 on the wheel support 19. On an opposite side of the wheel support axle or rotatable mount 27, from the wheel support pivotal mount 23, is an elongated opening 29 which is also angularly offset relative to a vertical axis passing through the wheel support axle or rotatable mount 27. The elongated slot 29 receives a headed stud 31 for stabilizing the wheel support during tensioning of the band saw blade 9, as will become apparent.

For adjustably pivotally moving the wheel support 19 about its pivotal mount 23 in order to provide tension force adjustment to the band saw blade 9, an elongated wire spring 33 is attached at one end to the wheel support 19, and is adjusted through a range of positions at its opposite end. The elongated wire spring 33 has a generally straight in longitudinal direction and round in cross-section unbiased shape; however, during tensioning adjustment, the elongated wire spring 33 will be slightly bent or curved in order to impart a moment to the wheel support 19 about the pivotal mount 23, which in turn applies a tensioning force to the band saw blade 9.

Figure 3:
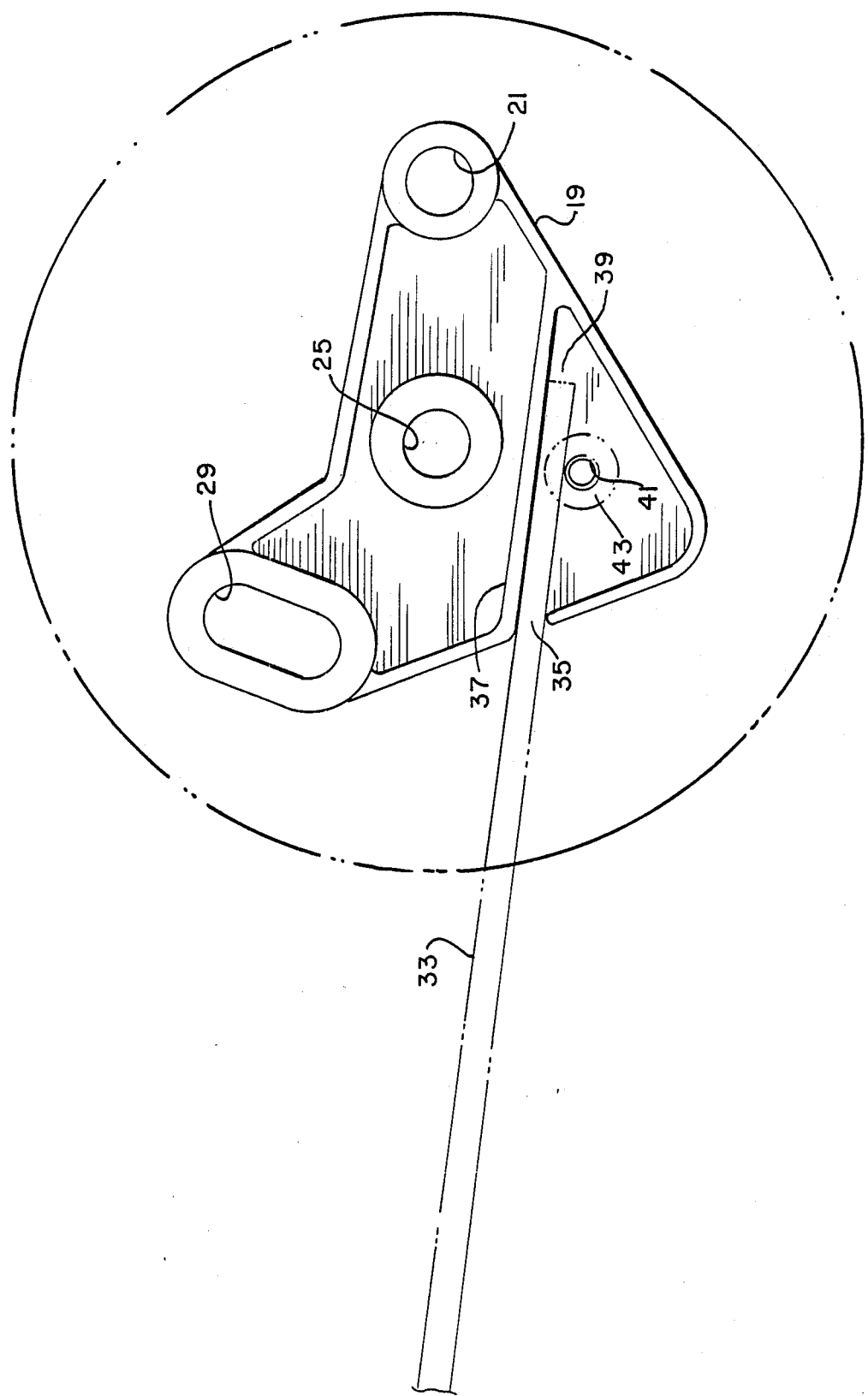
FIG. 3 is a further enlarged diagrammatic view of the wheel support component of the quick action band saw blade tensioning device of the present invention.

The wheel support 19 has an opening 35 and associated internal strut 37 which cooperate to form a trough 39 for receiving one end of the elongated wire spring 33 (See FIG. 3). The wheel support 19 has a threaded opening 41 adjacent the trough 39 in order to threadably mount and receive head stud 43 for engaging and securing the elongated wire spring 33 within the trough 39 of the wheel support 19.

The wheel support pivotal mount opening 21 and the wheel support elongated opening 29 are positioned on different sides of the wheel support rotatable mount opening 25 with respect to each other and on the same side of the wheel support rotatable mount aperture 25 with respect to the threaded stud which attaches the elongated wire spring 33 to the wheel support 19.

At its other end, the elongated wire spring 33 is mounted for movement relative to a curvilinear slot 45 provided in the supporting frame. Specifically, the elongated wire spring 33 is longitudinally slidably movable relative to a manually adjustable catch mechanism 47 positioned to move within the curvilinear slot 45. The catch mechanism includes a thumb knob 49 for tightening the catch mechanism 47 relative to one of a series of serrated teeth 51 positioned adjacent the curvilinear slot 45, to thereby position or locate the catch mechanism 47 in various selected positions along the curvilinear slot 45. The catch mechanism 47 includes a depending arm (not shown) which is complementary configured relative to the curvilinear slot 45 for reception therein. The catch mechanism 47 further includes a complementary serrated tooth surface on its lower face (not shown) for complementary mating engagement with any one of the series of serrated teeth 51 so as to position the catch mechanism 47 in a variety of positions relative to the curvilinear slot 45. The arc of the curvilinear slot 45 is about 30°, thus allowing the elongated wire spring 33 to be moved a similar arc about the pivot mount 23 of the wheel support 19. When slack is discovered in the band saw blade 9, the catch mechanism 47 can be moved to the desired position so as to impart further tension to the band saw blade 9.

Because the upper and lower band saw wheels aren't typically made to be perfectly true in total distance around the wheels, when the band saw machine is running, the longitudinally slidable or longitudinally free end of the elongated wire spring 33 compensates for variations in the total distance around the band saw wheels, so as to maintain the desired tension in the band saw blade 9. This is possible since the elongated wire spring 33 is longitudinally free or slidable relative to the catch mechanism 47, as discussed above.

For stabilizing the wheel support 19 during tensioning of the elongated wire spring 33 about its arc of movement, the elongated opening 29 of the wheel support 19 is movable relative to the shank of the headed stud 31. This does not in any way interfere with the pivotal movement of the wheel support 19 during tension adjustment; however, the shank of the headed stud 31 and the elongated opening 29 combine to stabilize the wheel support 19 during tensioning adjustment. It will be noted that the elongated opening 29 is configured arranged and dimensioned to permit pivotal movement of the wheel support 19, while combining with the headed stud 31 to stabilizes that movement.

From the foregoing description, it will be appreciated that it is a relatively simple matter to rotate the thumb knob 49 of the catch mechanism 47 in order to move the elongated wire spring through the 30° arc of the curvilinear slot 45 so as to position the catch mechanism 47 relative to the desired location in the series of serrated teeth 49, whereupon the thumb knob 49 can be tightened to clamp the catch mechanism 47 relative to the engaged serrated tooth 49 so as to clamp the deflected elongated wire spring 33 in place. At the other end of the deflected elongated wire spring 33, the wheel support 19 is pivotally moved about its pivotal mount 23, while being stabilized by the elongated opening and stud combination 29, 31 respectively, so as to impart more or less tension to the band saw blade 9, as may be desired.

As compared with prior art devices employing rotary knob/coil spring combinations, and other tension devices, it will be appreciated that the quick action band saw blade tensioning device 17 of the present invention can be quickly moved to the desired position and then locked in place. This tensioning adjustment can occur prior to energizing the saw, so that the proper tension is in the blade for the cuts to be made, and then also permits removing the tension from the blade after the cutting is complete, to reduce the load on other parts of the machine.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in an limiting sense.

I claim:

1. A band saw machine including a supporting frame, at least upper and lower band saw supporting wheels operatively rotatably mounted to the supporting frame, a band saw entrained and driven about the upper and lower band saw supporting wheels, and a band saw tensioning assembly including a wheel support pivotally mounted to the supporting frame about a wheel support pivotal mount, one of said upper and lower band saw supporting wheels being rotatably mounted to the wheel support about a wheel support rotatable mount, a flexible elongated wire spring for adjustably pivotally moving the wheel support and its rotatably mounted band saw supporting wheel about the wheel support pivotal mount so as to apply a tensioning force to the band saw as desired, said flexible elongated wire spring having first and second ends, one of said ends being fixed to said wheel support and the other of said ends being adjustably movable in a predetermined arc about the wheel support pivotal mount, said flexible elongated wire spring when adjustably moved in the predetermined arc bending throughout the length thereof for imparting a moment to the wheel support pivotal mount in order to apply a tensioning force to the band saw blade, and means for holding said other end of the elongated wire spring at various positions along the predetermined arc.

2. A band saw machine including a supporting frame, at least upper and lower band saw supporting wheels operatively rotatably mounted to the supporting frame, a band saw entrained and driven about the upper and lower band saw supporting wheels, and a band saw tensioning assembly including a wheel support pivotally mounted to the supporting frame about a wheel support pivotal mount, one of said upper and lower band saw supporting wheels being rotatably mounted to the wheel support about a wheel support rotatable mount generally centrally positioned on said wheel support, means for adjustably pivotally moving the wheel support and its rotatably mounted band saw supporting wheel about the wheel support pivotal mount so as to apply a tensioning force to the band saw as desired, and means for holding the wheel support in a stable plane relative to the frame during adjustment and tensioning of the band saw, said last mentioned means comprising a spaced point support system in operative engagement between said wheel support and said frame, each point support in said spaced point support system engaging both said wheel support and said frame and holding said wheel support in a stable parallel plane relative to said frame during adjustment and tensioning of said band saw.

3. The machine as defined in claim 2 wherein the wheel support has a general triangular shape with spaced corners, and said spaced point support system includes point support adjacent the triangular corners of said wheel support.

4. The machine as defined in claim 1 wherein the other end of said flexible elongated wire spring is operatively associated to means for compensating in variations of said band saw supporting wheels during operation thereof.

5. The machine as defined in claim 1 wherein said flexible elongated wire spring has a generally straight in longitudinal direction and round in cross-section unbiased shape.

6. The machine as defined in claim 1 wherein the other end of the flexible elongated wire spring is mounted for movement relative to a curvilinear slot in the frame, means for locating said other end of the flexible elongated wire spring at various positions along said curvilinear slot to maintain the tensioning force to the saw blade, and the other end of said flexible elongated wire spring being longitudinally slidably movable relative to said locating means.

7. The machine as defined in claim 6 wherein the means for locating said other end of the elongated wire spring at various positions relative to said curvilinear slot includes a manually adjustable catch mechanism that is interengaged relative to a series of catch engaging positions adjacent said curvilinear slot.

8. The machine as defined in claim 1 wherein said wheel support includes means for stabilizing the wheel support during adjustment thereof.

9. The machine as defined in claim 8 wherein said means for stabilizing the wheel support includes an elongated opening provided in the wheel support spaced from the wheel support pivot mount and on an opposite side of the wheel support rotatable mount, and a headed stub having a shank extending through the elongated opening and being attached to the supporting frame, said elongated opening being configured, arranged and dimensioned to permit pivotal movement of said wheel support during adjustment while the stud shank and elongated opening combine to stabilize the wheel support during adjustment.

10. The machine as defined in claim 9 wherein the wheel support pivotal mount and the wheel support elongated opening are positioned on different sides of said wheel support rotatable mount with respect to each other and on the same side of said wheel support rotatable mount with respect to the attachment of the elongated wire spring to said wheel support.

11. The machine as defined in claim 10 wherein the wheel support includes a trough for receiving the fixed end of said flexible elongated wire spring, and a headed stud threadably mounted to the wheel support in proximity to the flexible elongated wire spring for engaging and securing the elongated wire spring within the trough of the wheel support.

12. In a band saw machine having a band saw entrained and driven about at least upper and lower band saw supporting wheels which are operatively rotatably mounted in a supporting frame, wherein the improvement comprises a band saw tensioning assembly including a wheel support pivotally mounted to the supporting frame about a wheel support pivotal mount, one of said upper and lower band saw supporting wheels being rotatably mounted to the wheel support about a wheel support rotatable mount, and a flexible elongated wire spring for adjustably pivotally moving said wheel support and its rotatably mounted band saw supporting wheel about the wheel support pivotal mount so as to apply a tensioning force to the band saw as desired, said flexible elongated wire spring having first and second ends, one of said ends being fixed to said wheel support and the other of said ends being adjustably movable in a predetermined arc about the wheel support pivotal mount, said flexible elongated wire spring when adjustably moved in the predetermined arc bending throughout the length thereof for imparting a moment to the wheel support pivotal mount in order to apply a tensioning force to the band saw blade, and means for holding said other end of the elongated wire spring at various positions along the predetermined arc.

13. The improvement as defined in claim 12 wherein the other end of said flexible elongated wire spring is operatively associated to means for compensating in variations of said band saw supporting wheels during operation thereof.

14. The improvement as defined in claim 12 wherein said flexible elongated wire spring has a generally straight in longitudinal direction and round in cross-section unbiased shape.

15. The improvement as defined in claim 12 wherein the other end of the flexible elongated wire spring is mounted for movement relative to curvilinear slot in the frame, means for locating said other end of the elongated wire spring at various positions along said curvilinear slot to maintain the tensioning force to the saw blade, and the other end of said elongated wire spring being longitudinally slidably movable relative to said locating means.

16. The improvement as defined in claim 15 wherein the means for locating said other end of the flexible elongated wire spring at various positions relative to said curvilinear slot includes a manually adjustable catch mechanism that is interengaged relative to a series of catch engaging positions adjacent said curvilinear slot.

17. The improvement as defined in claim 11 wherein said wheel support includes means for stabilizing the wheel support during adjustment thereof.

18. The improvement as defined in claim 17 wherein said means for stabilizing the wheel support includes an elongated opening provided in the wheel support spaced from the wheel support pivot mount and on an opposite side of the wheel support rotatable mount, and a headed stud having a shank extending through the elongated opening and being attached to the supporting frame, said elongated opening being configured, arranged and dimensioned to permit pivotal movement of said wheel support during adjustment while the stud shank and elongated opening combine to stabilize the wheel support during adjustment.

19. The improvement as defined in claim 18 wherein the wheel support pivotal mount and the wheel support elongated opening are generally positioned on different sides of said wheel support rotatable mount with respect to each other and on the same side of said wheel support rotatable mount with respect to the attachment of the elongated wire spring to said wheel support.

20. The improvement as defined in claim 19 wherein the wheel support includes a trough for receiving the attached end of said flexible elongated wire spring, and a headed stud threadably mounted to the wheel support in proximity to the elongated wire spring for engaging and securing the elongated wire spring within the trough of the wheel support.

* * * * *